United States Patent
Karlsson et al.

(10) Patent No.: US 12,239,994 B2
(45) Date of Patent: Mar. 4, 2025

(54) GRANULATOR MILL

(71) Applicant: RAPID GRANULATOR AB, Bredaryd (SE)

(72) Inventors: Henrik Karlsson, Värnamo (SE); Magnus Blom, Värnamo (SE)

(73) Assignee: RAPID GRANULATOR AB, Bredaryd (SE)

( * ) Notice: Subject to any disclaimer, the term of this patent is extended or adjusted under 35 U.S.C. 154(b) by 646 days.

(21) Appl. No.: 17/286,676

(22) PCT Filed: Nov. 18, 2019

(86) PCT No.: PCT/EP2019/081634
§ 371 (c)(1),
(2) Date: Apr. 19, 2021

(87) PCT Pub. No.: WO2020/109052
PCT Pub. Date: Jun. 4, 2020

(65) Prior Publication Data
US 2021/0339262 A1 Nov. 4, 2021

(30) Foreign Application Priority Data

Nov. 27, 2018 (EP) .................................... 18208661

(51) Int. Cl.
*B02C 18/14* (2006.01)
*B02C 18/22* (2006.01)
(Continued)

(52) U.S. Cl.
CPC ........ *B02C 18/148* (2013.01); *B02C 18/2291* (2013.01); *B29B 17/04* (2013.01); *B29B 17/0412* (2013.01); *B02C 2018/162* (2013.01)

(58) Field of Classification Search
CPC ..... B02C 18/144; B02C 18/148; B02C 18/16; B02C 18/2291; B02C 2018/162; B02C 2018/188
See application file for complete search history.

(56) References Cited

U.S. PATENT DOCUMENTS 3,419,223 A * 12/1968 Morin .................... B02C 18/144
                                                   241/73
4,073,444 A *  2/1978 Pav ........................ B02C 18/144
                                                   241/73
(Continued)

FOREIGN PATENT DOCUMENTS

EP      0136395 A2 *  4/1985  ............. B02C 18/16
EP      2321054 A1    5/2011
(Continued)

OTHER PUBLICATIONS

International Search Report and Written Opinion of the International Searching Authority, issued in PCT/EP2019/081634, mailed Feb. 2, 2020; ISA/EP.

*Primary Examiner* — Jared O Brown
(74) *Attorney, Agent, or Firm* — Harness, Dickey & Pierce, P.L.C.

(57) ABSTRACT

Granulator mill (1) comprising a frame (10), a cutter housing (20) with a granule chamber (22) comprising at least one non-rotatable blade (24) inside the granule chamber (22), and further comprising a rotatable rotor (30) arranged inside the granule chamber (22). The rotor (30) comprises blades (32, 34) which are arranged for cooperation with the non-rotatable blade (24) for granulating waste material to granules. A normal (n) to a first opening (26a) of the granule chamber (22) is pointing substantially vertically upwards in the normal position of use of said granulator mill (1), and characterising is that the cutter housing (20) is pivotably arranged at the frame (10) by means of a first pivot means (28), for pivoting the cutter housing (20) between the normal position of use and a cleaning position. In the cleaning position, the normal (n) of the first opening (26a) of the granule chamber (22) points towards a surface plane of the substrate.

7 Claims, 4 Drawing Sheets

(51) Int. Cl.
*B29B 17/04* (2006.01)
*B02C 18/16* (2006.01)

(56) References Cited

U.S. PATENT DOCUMENTS

| | | | | |
|---|---|---|---|---|
| 4,198,005 | A * | 4/1980 | Eiff | B02C 18/16 |
| | | | | 241/73 |
| 4,212,432 | A * | 7/1980 | Bohne | B02C 13/282 |
| | | | | 241/285.3 |
| 4,718,614 | A * | 1/1988 | Hausler | B02C 13/282 |
| | | | | 241/189.1 |
| 5,553,797 | A * | 9/1996 | Axelsson | B02C 18/148 |
| | | | | 241/285.3 |
| 6,371,393 | B1 * | 4/2002 | Kohl | B02C 13/282 |
| | | | | 241/73 |
| 7,600,708 | B2 | 10/2009 | Karlsson et al. | |
| 8,579,221 | B2 * | 11/2013 | Lester | B02C 19/0062 |
| | | | | 241/285.3 |
| 2018/0200723 | A1 * | 7/2018 | Sun | B02C 18/146 |

FOREIGN PATENT DOCUMENTS

| | | | | |
|---|---|---|---|---|
| WO | WO-2008025322 A2 * | 3/2008 | | B02C 13/282 |
| WO | 2009156454 A1 | 12/2009 | | |

* cited by examiner

Fig. 1b  Fig. 1c (section A-A)

GRANULATOR MILL

CROSS-REFERENCE TO RELATED APPLICATIONS

This application is a 371 U.S. National Stage of International Application No. PCT/EP2019/081634, filed on Nov. 18, 2019, which claims priority to European Application No. 18208661.1, filed on Nov. 27, 2018. The entire disclosures of the above applications are incorporated herein by reference.

TECHNICAL FIELD

The present invention relates generally to a granulator with improved accessibility and by that improved cleaning possibilities of the mill and the cutter house of the granulator.

BACKGROUND ART

Granulators are used for example within the plastics industry for recycling or reuse of plastic waste. A granulator comprises a granulator mill for grinding the plastic waste into granules of approximately the same mutual size. A special type of granulator is a so-called slow-speed granulator, which is especially designed for "beside-the-press" recycling of hard and brittle plastic material. This type of granulator may comprise a so-called cutter house into which the granulator mill is positioned. The granulator mill may comprise a rotor, onto which periphery knives are arranged and the knives cooperate with the static parts of the cutter house such as cutter house walls or fixed blades/knives. The periphery knives may be arranged as low knives only protruding a small distance from the rotor, but also as one or more longer knives protruding a greater radial distance from the rotor, sometimes called hook-knives or hook-blades. The long knives are arranged at a distance from each other along the axial direction of the rotor and are arranged to "pre-cut" longer plastic parts into shorter parts, which then falls down to the low knives for final cutting into granules. This type of granulator may further be mounted on a frame with wheels for easily moving the granulator position in a plant. The invention preferably relates to this type of slow-speed granulator.

Since the production of plastic uses different colors of the plastic material of course also the plastic waste is of different colors. One very important feature of a granulator is the ability to clean the interior of the granulator before a change can be made to a new plastic quality or another color. For example, if a black material is granulated with the granulator, and after that a transparent material is to be granulated, it is crucial to be able to clean the granulator to 100% clean. The smaller the granules, the greater probability that the granules get stuck or wedge into narrow spaces within the granulator mill or cutter housing. Areas within which granules tend to wedge is for example in a space extending in an axial direction between a rotatable rotor and the static housing or scrapers of the granulator mill, but also between the pre-cut knives (long knives) and walls of the cutter housing surrounding the pre-cut knives. For this reason, the housing of the granulators has previously been constructed to be openable in different ways.

A known solution is presented in WO2017/049979A1, which discloses a granulator for plastics, comprising a hopper, a grinding box body arranged under the hopper and a base for fixedly arranging the grinding box body. The grinding box body comprises a lower box body and an openable upper box body, and a rotary knife holder is arranged in the grinding box body. At least a rotary knife is fixedly arranged on the lower box body and further arranged in the grinding cavity of the rotary knife holder and the rotary knife holder consists of a separable knife holder main body and a separable knife holder half body. The knife half body can generate a displacement relative to the knife holder main body so that the grinding cavity can be opened and closed. Since the rotary knife holder is in a separable arrangement and is divided into two half parts—the knife holder main body and the knife holder half body—residues left in the grinding cavity can be cleared up by moving the knife holder half body to open the grinding cavity of the rotary knife holder when the grinding cavity is cleaned. Since only the upper half of the box body is openable, the lower part always remains in a horizontal position, which complicates the cleaning process as gravity tends to keep the plastic particles into the lower part. And if longer knives also are at hand, as for example at the embodiment presented in FIG. 7 of the document, the cleaning between the longer knives and the surrounding knife-walls is difficult since one knife always is positioned inside the surrounding walls. Further, it is dangerous due to several aspects. Firstly, since the normal cleaning is performed manually with compressed air, blown towards the interior of the box body, plastic material may hit the face of the person performing the cleaning. Secondly, it is dangerous to rotate the knives because they are sharp and the motor connection and the gear makes it hard to rotate. Another aspect is that it is not entirely visible, which means that it is impossible to see if it is totally clean with no residues of plastics inside the cavities.

Another document EP0660751B1 discloses a granulating mill having a cutter which is rotatably disposed in a granulate container. Pieces of material to be comminuted are supplied to the granulate container from a collection hopper. The cutter has shaft ends which are rotatably mounted on a centrally disposed subframe, which is itself pivotably mounted on a main pivot shaft attached to a main frame. The cutter and collection hopper are mutually pivotable about a first pivot, and the granulate container is pivotable about a second pivot. In addition, the cutter, collection hopper and granulate container are pivotable about the main pivot shaft via the subframe. A similar drawback as the foregoing presented solution applies also for this solution, since the lower part is horizontal and plastic waste may be blown in the face of the person cleaning the interior and since it is not possible to see if it is clean between the cutter and the collection hopper.

US2005006509A discloses a granulator mill which comprises a mill housing which has an openable part and a fixed part, and an infeed hopper. In the fixed part, there is a rotor with a number of knife blades which co-operate with fixed blades in the mill housing. In the openable part, there is a discharge section which is discrete from the interior of the mill housing by means of a grid which surrounds approximately 160 degrees of the rotor and extends in beneath it. The fixed part and the openable part are connected to one another by the intermediary of a pivot device with a vertical pivot axis. The end of the openable part facing away from the pivot axis is fixedly lockable in the fixed part at a journal box of the rotor and is centered there by a guide surface at the journal box and a guide surface on the openable part. The openable part is horizontally pivotal and may be opened manually. The infeed hopper is vertically pivotal about a horizontal axis and opened by means of a motor. The infeed hopper and the openable part have mutually engaging locking means which lock the infeed hopper in the closed position when the openable part is closed. This design is a good solution suitable for classic granulator mills with a grid and it also provides a possibility to visibly check the cleaning result. Since the openable part is designed as a hinged door which surrounds the entire length of the mill, the opening of the door requires some space to be completely open while cleaning the interior, which might be a drawback with this solution. Another drawback might be that the gravity only partly contributes to the cleaning, since at least half the mill is facing upwards, but the solution is indeed also a good alternative of a granulator mill.

SUMMARY OF INVENTION

An object of the present invention is to solve the above-mentioned problems and by that provide a granulator mill which is easier and safer to clean.

According to an aspect of the invention, the granulator mill comprises a frame for carrying the granulator mill while placed on a substrate of any kind. Preferably the frame is arranged to stand directly on the substrate or indirectly on the substrate via a number of wheels, in the normal position of use of the granulator mill. The normal position of use is for example that the frame is positioned on a floor in or beside a production line where plastic waste is to be granulated. The wheels are provided if there is a need for moving the granulator mill around in the plant. The frame with the granulator mill may of course be positioned on a shelf or the like if necessary. Further, the granulator mill comprises a cutter housing arranged at the frame, which cutter housing comprising a granule chamber for receiving plastic waste material. The granule chamber comprises at least one non-rotatable blade detachably arranged inside the granule chamber and further at least one a rotatable rotor arranged inside the granule chamber. The rotor comprising a plurality of blades (knives) arranged at a periphery of the rotor, which blades are arranged for cooperation with the at least one non-rotatable blade, for granulating waste material to granules. In the normal position of use of the granulator mill, a normal to an opening of the granule chamber is pointing substantially vertically upwards. To facilitate a better and safer cleaning of the granulator mill, the cutter housing is pivotably arranged at the frame by means of a first pivot means. By that, the cutter housing including the granule chamber and the rotor is pivotable between the normal position of use and a cleaning position, wherein in the cleaning position, the normal of the opening of the granule chamber points towards a surface plane of the substrate. The surface plane may for example be the floor or the plane of a shelf or the plane of any substrate onto which the frame is positioned.

By such an arrangement, the granulator mill is easier and safer to clean, since the opening of the cutter housing faces the substrate, i.e. faces downwards. This means that the gravity helps the granules to fall out from the interior of the granule chamber while blowing compressed air into the same, which improves the cleaning compared to prior art. Further, it means that the risk that small granules hits the face or the eyes of the user while blowing compressed air into the cutter housing is minimized, compared to prior art. This is because it is more likely that the user looks down into the granule chamber while cleaning in prior art mills, than in the present solution where the opening faces downwards.

According to an embodiment, the cutter housing comprises an upper part and a lower part, wherein the upper part comprises the granule chamber and the rotor and the lower part is detachably arranged at the upper part. This facilitates an even more improved cleaning since the rotor and granule chamber is accessible from the underside when the lower part is detached. When the complete cutter housing is tilted to the cleaning position the lower part faces at least slightly upwards and is thereby easy to dismount. If a thorough cleaning, with a 100% cleaning of the granule chamber and blades, is needed, the lower part preferably is removed. The removed lower part may easily be cleaned, and the accessibility of the rotor and granule chamber is very good. By that, it is possible to blow compressed air from the underside of the upper part of the cutter housing, that is in a direction from the lower part (which is removed) towards the upper part with its granule chamber, rotor and blades, whereby eventual granules leave the opening of the granule chamber in a direction towards the substrate. An improved, easier and safer cleaning compared to prior art solutions is thereby achieved.

According to an embodiment, the first pivot means is arranged at the upper part of the cutter housing. By that, the lower part of the cutter housing is not affected by the positioning of the first pivot means and may therefore be detached from the upper part without difficulties. Further, the positioning of the first pivot means at the upper part enables a proper balancing of the pivoting function relative to the centre of gravity.

According to an embodiment, the upper part of the cutter housing comprises two gables on respective sides of the granule chamber, which gables extends from the upper part in a direction towards the rotor and pass the rotor. Further, the gables comprise first through holes for the rotor, which means that the rotor rotates freely relative to the gables. And the first pivot means is actually two pivot means, each arranged at a respective gable at a distance from respective through holes, such that the cutter housing, including the upper part with the granule chamber, rotor and blades as well as the lower part, is pivotable around the first pivot means. The two pivot means are preferably pivotably arranged at a respective bracket, each arranged at the frame outside the respective gable, whereby the pivoting axis is arranged at a distance from the rotor axis (which is the same as the centre axis of the through holes) and preferably at substantially the same horizontal level as the rotor axis. This enables a well-balanced pivoting motion of the complete cutter housing.

According to an embodiment, the non-rotatable blade is detachably arranged inside the granule chamber by screwing from the outside (i.e. underside) of the upper part of the cutter housing. This is possible by means of screws and by that the upper part of the cutter housing comprises second through holes arranged for the screws. Further, the non-rotatable blade comprises threads arranged for engagement with the screws, such that the non-rotatable blade is fixedly attached to the inside of the granule chamber wall, by screws from the outside, which means that a flat surface of the granule chamber wall with the non-rotatable blades is provided. In prior art solutions, the non-rotatable blades are fixedly attached from the inside of the chamber which means that screw heads may interfere with the feeding of the plastic waste down to the blades of the rotor.

According to an embodiment, the lower part of the cutter housing comprises third through holes arranged for access to the screws described above, such as the non-rotatable blade inside the granule chamber may be dismounted without dismounting the lower part from the upper part of the cutter housing. As the blades tend to be worn it must be easy to change the non-rotatable blades which is facilitated by the through holes of the lower part of the cutter housing. Further, as the complete cutter housing is tilted in the cleaning position, it is easy to see and access the screws in this position.

According to yet another embodiment, the cutter housing comprises a second pivot means arranged at a distance from the first pivot means, wherein the second pivot means is pivotally attached to the frame by a dampening means/spring device. Since the cutter housing is rather heavy, the pivoting of the same becomes easier when having the spring device acting as a helping force while pivoting the cutter housing from the using position to the cleaning position. And vice versa, the dampening means/spring device makes sure that the pivoting motion back to using position is controlled and safe by a soft motion.

According to an embodiment, the granulator mill comprises a motor attached to the frame, which motor is arranged for driving the rotor, and the rotor is detachably arranged relative the motor by means of a clutch. The clutch is displaceably arranged relative the rotor such that the displacement of the clutch releases the rotor from the motor. To facilitate the easy and safe cleaning of the cutter housing, by pivoting the same from the using position to the cleaning position, it is very convenient and quick to release the rotor from the motor with the clutch. The clutch is preferably arranged as two circular discs with protrusions for mutual engagement with each other. The discs are displaceable relative each other by means of a handle or the like such that the protrusions engage/disengage with each other. In prior art solutions, for example similar solutions like WO2017/049979A1, the motor and the rotor are normally not detachable from each other, making it rather difficult and unsecure to rotate the rotor with sharp blades by hand, while cleaning, to ensure that all plastic granules are removed. The present invention enables both the pivoting of the complete cutter house as well as a free rotating rotor, which is a far safer solution compared to prior art.

According to an embodiment, an infeed hopper is arranged upstream of the cutter housing, for feeding waste material into an opening of the granule chamber. The infeed hopper is pivotably arranged at the frame by means of a third pivot means such that it is pivotable between a closed position and an open position relative to the opening of the granule chamber. The plastic waste material is fed into the infeed hopper which is attached to the opening of the granule chamber of the cutter housing, in the using position of the granulator mill. From the infeed hopper, the material is fed, i.e. falls down into the granule chamber via the opening, for being granulated into granules. When the cutter housing shall be cleaned, the infeed hopper is detached from the cutter housing/the opening of the granule chamber, preferably by unlocking a lock and pivoting the infeed hopper from closed to open position. Thus, the cutter housing is able to be pivoted since the infeed hopper is out of way, and the cutter housing may be cleaned.

According to yet another embodiment, an outfeed hopper is arranged downstream of the cutter housing, for receiving granules from the granule chamber. The outfeed hopper is detachably arranged relative to the cutter housing, such that the cutter housing is able to be pivoted for cleaning. When the cutter housing shall be cleaned, the outfeed hopper is detached from the cutter housing, preferably by unlocking a lock and disconnecting the outfeed hopper from the cutter housing, whereafter the pivoting of the cutter housing is possible.

Further possible features and benefits of this solution will become apparent from the detailed description below.

BRIEF DESCRIPTION OF DRAWINGS

The invention is now described, by way of example, with reference to the accompanying drawings, in which:

FIG. 1b is a side view of the granulator mill according to the invention in the using mode.

FIG. 1c is a vertical cross-section through the granulator mill in the using mode.

DETAILED DESCRIPTION

Briefly described, a granulator mill, designed for enhanced cleaning results of the cutter housing and enhanced safety for the user during cleaning, is disclosed.

In the description below, various directions will be given with reference to a granulator mill arranged in a using position and a cleaning position. In any position, the granulator mill normally stands on a substrate, as a floor, a shelf or the like, and directions given below such as upper, lower, upwards, downwards etc. is made by reference to the normal use of the granulator mill.

Figure 1A:
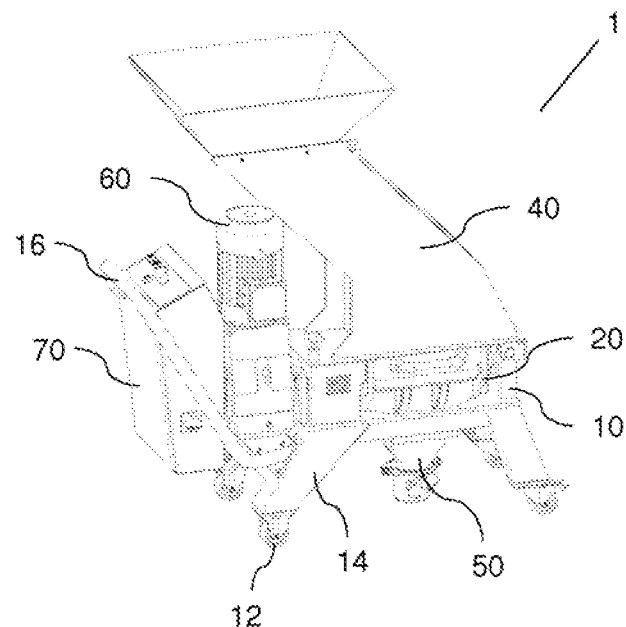
FIG. 1a is a perspective view of a granulator mill according to the invention in a using mode.
Figure 1A:
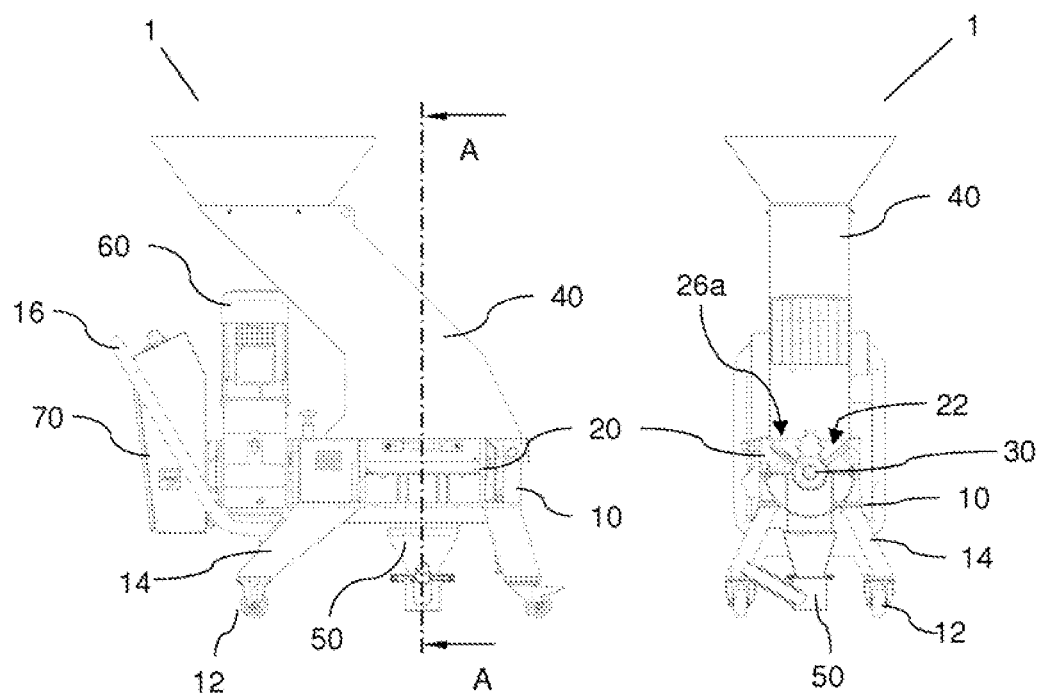

FIG. 1a-b are different views of a granulator mill 1 according to the invention in a using mode and FIG. 1c is a cross-section of FIG. 1b. The granulator mill 1 comprises a frame 10 onto which a cutter housing 20 is arranged. The frame 10 is arranged to support the cutter housing 20 as well as a motor 60 and electrical connections and controls 70 etc. The frame 10 of a preferred embodiment is arranged with a set of four wheels 12, each wheel arranged on a respective leg 14 of the frame 10, for enabling a free positioning of the granulator mill 1 at a plant. Further, the frame 10 comprises a handle 16, and by the wheels 12 and the handle 16, the granulator mill 1 is easy to relocate to any position, for taking care of plastic waste material at different places in a plant. An infeed hopper 40 is pivotally arranged to the frame 10 upstream of the cutter housing 20, and is on the upper side of the cutter housing 20 as seen in FIG. 1a-c. The plastic waste material is fed into the infeed hopper 40 and falls from the infeed hopper 40 by gravity to the cutter housing 20. The cutter housing 20 comprises a granule chamber 22 which comprises an open top or first opening 26a for receiving the waste material. The waste material slides down in the granule chamber 22 towards a rotatable rotor 30, which comprises first and second blades 32, 34 for granulating the plastic waste material to granules. The granule chamber 22, the rotor 30 and the first opening 26a are visible in FIG. 1c and will be described further below. Downstream of the cutter housing 20, and below the cutter housing 20 as seen in FIG. 1a-c, is an outfeed hopper 50 detachably arranged to the cutter housing 20. The outfeed hopper 50 is arranged to receive granules from the granule chamber 22, and normally an outfeed system (not visible) is coupled to the outfeed hopper 50 for further transportation of the granules away from the granulator mill 1.

Figure 2A:
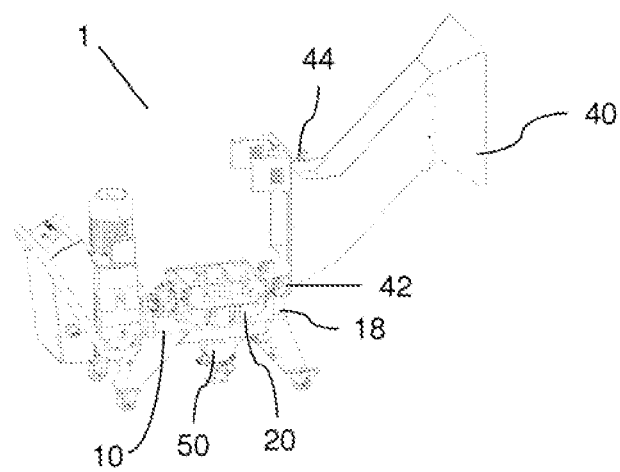
FIG. 2a is a perspective view of the granulator mill according to the invention in a first cleaning/service mode.

FIG. 2a is a perspective view of the granulator mill 1 according to the invention in a first cleaning or service mode. To access the cutter housing 20, the infeed hopper 40 is openable between a closed position (using mode—FIG. 1a-c) and an open position (first cleaning mode—FIG. 3a). Thus, the infeed hopper 40 is pivotally arranged to the frame 10 by means of third pivot means 42, preferably as a hinge-like connection between the infeed hopper 40 and hopper brackets 18 of the frame 10. The infeed hopper 40 preferably comprises at least one lock 44 (preferably two) for locking the infeed hopper 40 to the frame 10 as a protection, which prevents contact with moving parts of the granulator mill 1. The infeed hopper 40 further has the function of pressing the cutter housing 20 towards the frame 10 in the using mode. In the cleaning mode of the granulator mill 1, also the outfeed hopper 50 is disconnected from the cutter housing 20, to allow a proper cleaning of the interior of the granulator mill 1. The outfeed hopper 50 may also comprise at least one lock (not visible) for locking of the outfeed hopper 50 to the cutter housing 20.

Figure 2B:
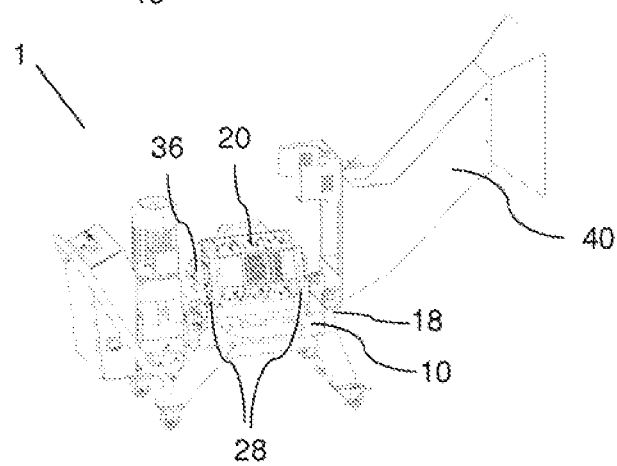
FIG. 2b is a perspective view of the granulator mill according to the invention in a second cleaning/service mode.
Figure 2C:
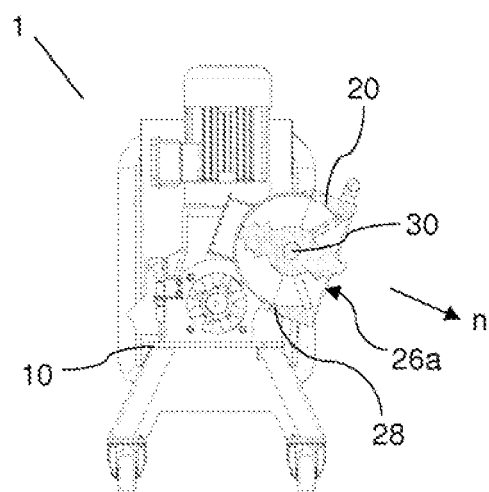
FIG. 2c is a vertical cross-section through of the granulator mill in the second cleaning/service mode.

FIG. 2b is a perspective view of the granulator mill 1 and FIG. 2c is a vertical cross-section through the granulator mill 1, in a second cleaning or service mode. To access the cutter housing 20, the infeed hopper 40 is opened as descried above to the first cleaning mode. Thereafter, the rotor 30 is decoupled from the motor 60 via a clutch 36 and the cutter housing 20 is tilted relative to the frame 10 to the second cleaning mode, by that the cutter housing 20 is pivotably arranged at the frame 10 by means of a first pivot means 28. By that, the complete cutter housing 20 including the granule chamber 22 and the rotor 30 is pivoted wherein, in the second cleaning mode, a normal (n) of the first opening 26a of the granule chamber 22 points towards a surface plane of the substrate on where the granulator mill 1 stands, instead as in the using mode, where the normal (n) to the first opening 26a of the granule chamber 22 points substantially vertically upwards, in the normal position of use (using mode) of said granulator mill 1, see also FIG. 3a. The first pivot means 28 preferably is a hinge-like connection between the cutter housing 20 and hopper brackets 18 of the frame 10.

Figure 3A:
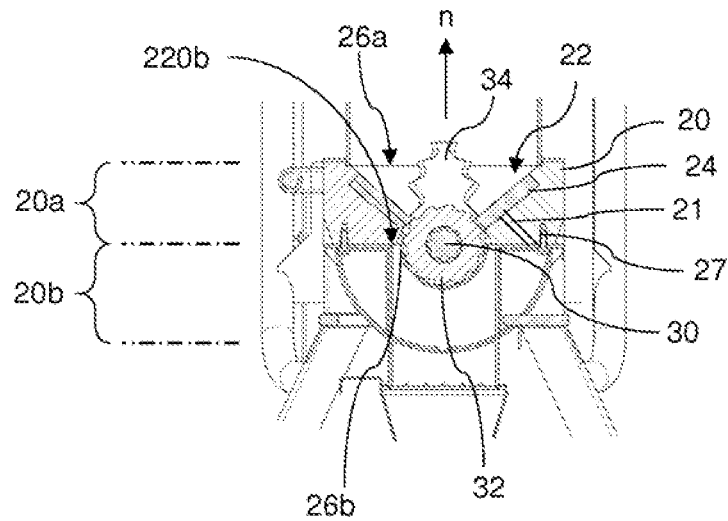
FIG. 3a is a detailed vertical cross-section through a cutter housing of the granulator mill.
Figure 3B:
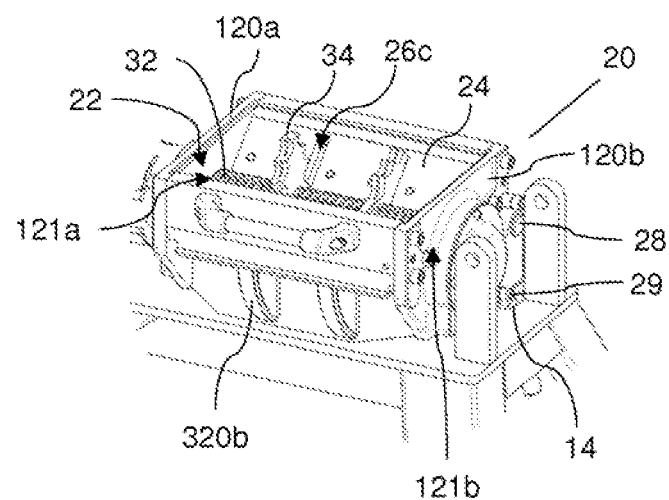
FIG. 3b is a perspective view of the cutter housing.
Figure 3C:
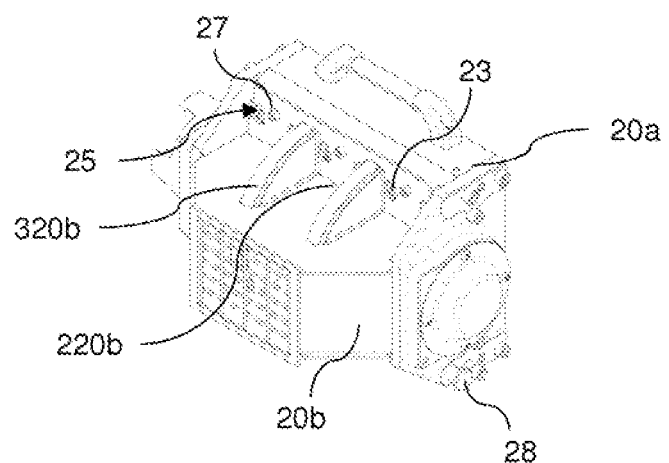
FIG. 3c is a perspective view of an underside the cutter housing.

FIG. 3a-c are detailed section and views of the cutter housing 20 and of the underside of the cutter housing 20. The cutter housing 20 comprises an upper part 20a and a lower part 20b, where the upper part 20a comprises the granule chamber 22 with the first opening 26a and its normal n and the rotatable rotor 30. Further, the upper part 20a of the cutter housing 20 comprises two gables 120a, 120b on respective sides of the granule chamber 22, which gables 120a, 120b extends from the upper part 20a in a direction towards the rotor 30 and pass the rotor 30. Each gable 120a, 120b comprises a respective first through hole 121a, 121b (not visible in the figure) allowing the rotor 30 to rotate freely relative the gables 120a, 120b, while the rotor 30 is driven by the motor 60. The motor 60 is arranged on the frame 10 outside the cutter housing 20 and its gables 120a, 120b, see FIG. 1a-b. The gables 120a, 120b comprise the first pivot means 28, for pivoting the complete cutter housing 20 relative the frame 10. The pivot means 28 are actually two pivot means 28, each arranged at a respective gable 120a, 120b at a distance from the respective first through holes 121a, 121b, and preferably at substantially the same vertical level as the rotor 30/first through holes 121a, 121b. This to enable a good balancing of the pivoting movement of the cutter housing 20 relative to the frame 10. According to a preferred embodiment, the cutter housing 20 also comprises second pivot means 29, which is arranged at a distance from the first pivot means 28. The second pivot means 29 is pivotally attached to the frame 10 via a dampening means/spring device 14, such that the pivoting of the cutter housing 20 from the using mode to the second cleaning mode is facilitated. And opposite, while pivoting the cutter housing 20 from the second cleaning mode to the using mode, the pivoting is safely braked by the dampening means 14, to avoid a dangerous and fast back-pivoting of the cutter housing 20.

The granule chamber 22 of the cutter housing 20 comprises at least one non-rotatable blade 24, which is detachably arranged inside the granule chamber 22, by screw attachment to the walls of the granule chamber 22. The fastening of the non-rotatable blade 24 to the walls is made by screwing from outside the upper part 20a of the cutter housing 20 by means of first screws 23, and the lower part 20b of the cutter housing 20 comprises second through holes 25 arranged for access to the screws 23. In turn, the non-rotatable blade 24 comprises threads arranged for engagement with the screws 23 such that the non-rotatable blade 24 may be fixedly arranged to the walls of the granule chamber 22, and the upper part 20a of the cutter housing 20 comprises second through holes 21 arranged for the screws 23. The granulator mill 1 further comprises the rotatable rotor 30, which is rotatably arranged inside the granule chamber 22, in a second opening 26b at the bottom of the granule chamber 22. The rotor 30 comprises the plurality of knives or blades 32, 34 which are arranged for cooperation with the non-rotatable blade 24 for granulating plastic waste material into granules in the granule chamber 22. The blades 32, 34 of the rotatable rotor 30 are according to a preferred embodiment a plurality of first blades 32, which protrudes a rather short first distance from the periphery of the rotor 30 and at least one longer second blade 34 (hook blade), which protrudes a longer second distance from the periphery of the rotor 30. The second distance of the second blade 34 is greater than the first distance of the first blades 32, such as a plastic waste material falling down into the granule chamber 22 via the first opening 26a is pre-cut by the long second blade/blades 34 to enable a further transport by gravity down to the plurality of lower first blades 32, which granulates the waste material to final granules with substantially equal size. The walls of the granule chamber 22 further comprises at least one recess 26c, corresponding with the longer second blade 34, such as the second blade 34 during the rotation may pass the wall of the granule chamber 22/the non-rotatable blade 24.

The lower part 20b of the cutter housing 20 is detachably arranged to the upper part 20a, for example by second screws 27, such that the lower part 20b firstly is arranged as a cover of the underside of the cutter housing 20, and thereby covering the first and second blades 32, 34 as well as the underside of the rotatable rotor 30, and secondly is arranged as a guiding funnel for the granules between the cutter housing 22 and the outfeed hopper 50. An alternative to the second screws 27 is to detachably arrange the lower part 20b of the cutter housing 20 to the upper part 20b by for example guiding grooves on the inside of the gables 120a, 120b (facing the lower part/cover) and corresponding protruding lips on the outer sides of the lower part 20b together with a lock. By such an arrangement, a tool-less detachment of the lower part 20b from the upper part 20a is achieved. The lower part 20b may according to this arrangement be attached between the gables 120a, 120b by a sliding movement, where the protruding lips of the lower part 20b slide into the guiding grooves of the gables 120a, 120b from the side to a final position. Then, the lower part 20b is locked in the final position by for example a spring-loaded pin with a handle, arranged on the lower part 20b, which pin is introduced into a corresponding hole or recess on the upper part 20a of the cutter housing 20. Since the infeed hopper 40 presses the cutter housing 20 towards the frame 10 in the using mode, as mentioned above, the lower part 20b of the cutter housing 20 is pressed between the upper part 20a and the infeed hopper 40, and thereby is secured to the upper part 20a in the using mode. Thereby, a relatively simple lock like a spring-loaded pin together with the lip/groove engagement, is enough to hold the lower part 20b to the upper part 20a, since this function only is in use when tilting the cutter housing 20 between the using mode and the cleaning mode.

As mentioned above, the rotatable rotor 30 with its first and second blades 32, 34 is rotatably arranged in the second opening 26b at the bottom of the granule chamber 22, wherein the plastic waste when granulated by the blades 24, 32, 34 passes the second opening 26b and falls down towards the outfeed hopper 50 while being guided by the funnel-like lower part 20b of the cutter housing 20. The lower part 20b preferably has a shape which corresponds to the rotor 30 and first and second blades 32, 34, which means that first regions 220b of the lower part 20b (the cover), arranged near the lower first blades 32, nearly abuts the first blades 32, and second regions 320b arranged near the longer second blades 34 surrounds the second blades 34. By that, the second regions 320b of the lower part 20b protrudes from the first regions 220b like semicircular covers with walls and a bottom. The semicircular covers/the second regions 320b have semicircular insides (following the tangent of the protruding and rotating second blades 34) but have outer shapes which are not totally semicircular. For example, may the outside of the second regions 320b comprises protruding supports for cooperation with the frame 10, for providing a stop or support between the frame 10 and the cutter housing 20 in the using position. The lower part 20b of the cutter housing 20 further comprises the second through holes 25, which are arranged for access to the screws 23 and preferably are arranged at the first regions 220b of the lower part 20b. By that, the non-rotatable blade 24 may be dismounted without dismounting the lower part 20b from the upper part 20a of the cutter housing 20, to facilitate a possibility to change the non-rotatable blade/blades 24, as described above.

Figure 4A:
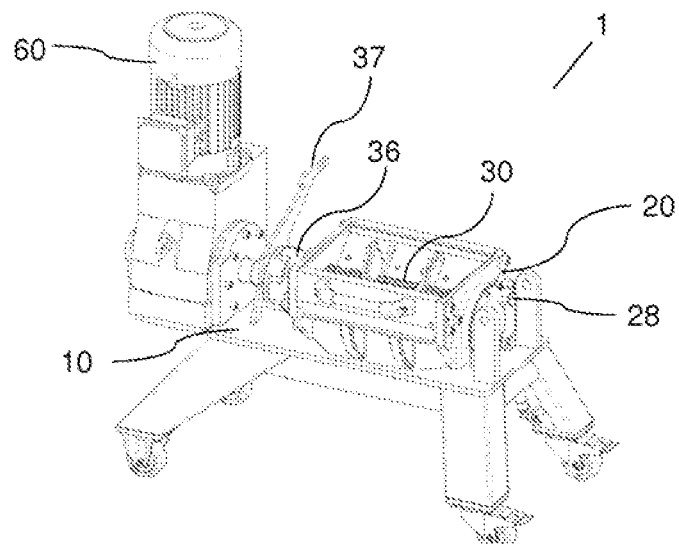
FIG. 4a is a perspective view of the granulator mill (without an infeed hopper and an outfeed hopper) when coupled to a motor via a clutch.
Figure 4B:
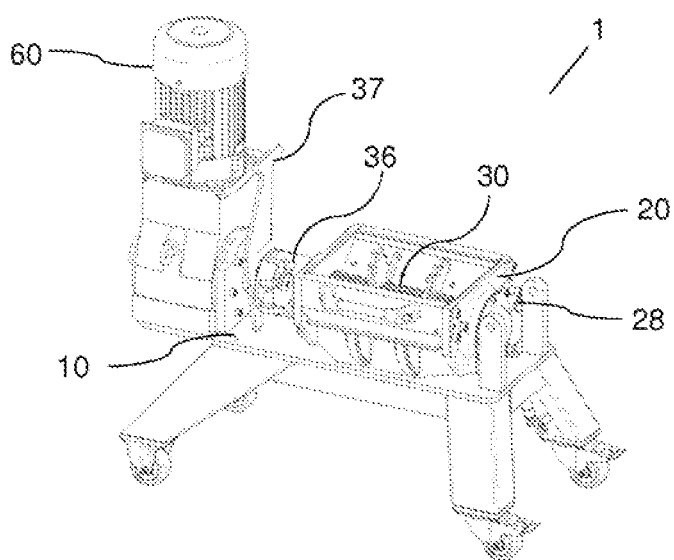
FIG. 4b is a perspective view of the granulator mill (without an infeed hopper and an outfeed hopper) when decoupled from the motor via the clutch.

FIG. 4a-b are perspective views of the granulator mill 1 without the infeed hopper 40 and the outfeed hopper 50 visible, where in FIG. 4a, the granulator mill 1 is in its using mode and in FIG. 4b in its first service mode. As mentioned above, the rotatable rotor 30 is driven by a motor 60, which is arranged at the frame 10. The rotor 30 is detachable from the motor 60 by means of the clutch 36 operated by a handle 37. The clutch 36 or parts of the clutch is displaceably arranged relative the rotor 30 such that the displacement of the clutch/parts of the clutch 36 by the handle 37, releases the rotor 30 from the motor 60. After that, the complete cutter housing 20 may be pivoted around the first pivot means 28 as explained above. When the rotor 30 is decoupled from the motor 60, it is very easy to rotate the rotor 30 while cleaning the granule chamber 22, and the blades 24, 32, 34, and the lower part 20b of the cutter housing 20 etc.

Reference to an element in the singular is not intended to mean "one and only one" unless explicitly so stated, but rather "one or more."

The invention claimed is:

1. A granulator mill comprising:
a frame arranged to stand directly on a substrate or indirectly on the substrate via a number of wheels in an operating position of said granulator mill,
a cutter housing arranged at the frame and having an upper part and a lower part, the upper part comprising a granule chamber and the lower part being detachably arranged at the upper part, wherein the granule chamber comprises at least one non-rotatable blade and a rotatable rotor inside the granule chamber,
wherein the rotatable rotor comprises a plurality of blades arranged at a periphery of the rotor and arranged for cooperation with the at least one non-rotatable blade for granulating waste material to granules,
wherein the non-rotatable blade is detachably arranged inside the granule chamber by screws inserted from outside the upper part of the cutter housing, wherein the upper part of the cutter housing comprises second through holes arranged for the screws and the non-rotatable blade comprises threads arranged for engagement with the screws and wherein the lower part of the cutter housing comprises third through holes arranged for access to the screws, such that the non-rotatable blade inside the granule chamber is configured to be dismounted without dismounting the lower part from the upper part of the cutter housing,
wherein a normal to a first opening of the granule chamber is pointing substantially vertically upwards in the operating position of said granulator mill, and
wherein the cutter housing is pivotably arranged at the frame by means of a first pivot means, for pivoting the complete cutter housing including the granule chamber, the upper part, the lower part, and the rotor between the operating position and a cleaning position, wherein in the cleaning position, the normal to the first opening of the granule chamber points towards a surface plane of the substrate.

2. The granulator mill according to claim 1, wherein the first pivot means is arranged at the upper part of the cutter housing.

3. The granulator mill according to claim 1, wherein the upper part of the cutter housing comprises two gables on respective sides of the granule chamber, the gables extend from the upper part in a direction towards the rotor and pass the rotor, wherein the gables comprise first through holes for the rotor, and wherein the first pivot means is two pivot means each arranged at a respective one of the two gables at a distance from the first through holes.

4. The granulator mill according to claim 1, wherein the cutter housing comprises a second pivot means arranged at a distance from the first pivot means, wherein the second pivot means is pivotally attached to the frame via a dampener.

5. The granulator mill according to claim 1, wherein the granulator mill comprises a motor attached to the frame and arranged for driving the rotor, and the rotor is detachably arranged relative to the motor by a clutch displaceably arranged relative to the rotor such that a displacement of the clutch releases the rotor from the motor.

6. The granulator mill according to claim 1, wherein an infeed hopper is arranged upstream of the cutter housing, for feeding waste material into the first opening of the granule chamber, the infeed hopper being pivotably arranged at the frame by means of a third pivot means such that the infeed hopper is pivotable between a closed position and an open position relative to the first opening of the granule chamber.

7. The granulator mill according to claim 1, wherein an outfeed hopper is arranged downstream of the cutter housing for receiving granules from the granule chamber, the outfeed hopper being detachably arranged relative to the cutter housing.

* * * * *